G. TUGNOT.
Lathe.
No. 12,008.
Patented Nov. 28, 1854.
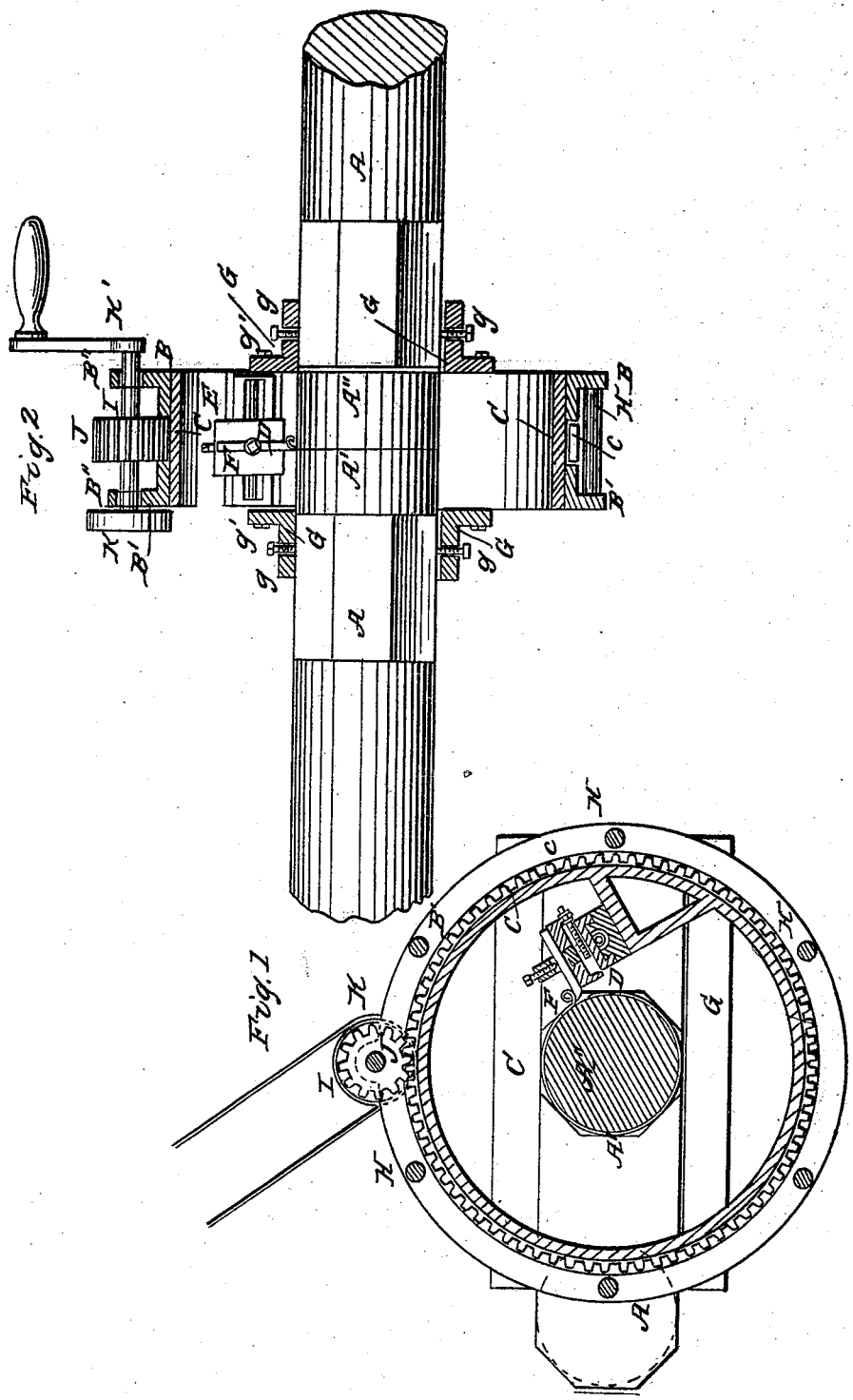

UNITED STATES PATENT OFFICE.

GEORGE TUGNOT, OF NEW YORK, N. Y.

ROTARY LATHE.

Specification of Letters Patent No. 12,008, dated November 28, 1854.

*To all whom it may concern:*

Be it known that I, GEORGE TUGNOT, of the city, county, and State of New York, have invented a new and useful Improvement in Rotary Lathes; and I do hereby declare that the following is a full and exact description thereof.

The nature of my invention consists in placing the tool rest on the inside of a rotating cylinder, the turning being accomplished by the rotation of the tool around the object to be turned, the latter being fixed in the center of the cylinder.

To enable others skilled in the art to make and use my invention I will proceed to describe its construction and operation reference being had to the annexed drawings, forming a part of this specification, in which—

Figure 1, is a side sectional elevation of my improvement, and, Fig. 2, a front sectional elevation of the same.

Similar letters of reference indicate the same parts.

A is a crank fixed in my improved lathe, and shown in the act of being turned; A', portion of the same not turned; A'', portion turned; B, B', fixed cylindrical frame of the lathe; B'', bearings of the driving shaft I; C, rotating cylinder, on the inner surface of which the slide rest D, is secured; E, seat of the slide rest; F, the cutting tool; G, side frames which secure the object to be turned to the fixed frame, B; J driving pinion; K driving pulley; K' hand crank; (c) teeth on the periphery of rotating cylinder C; g g', screws, for fastening the object to be turned to the fixed frame B.

Having provided a fixed cylindrical frame composed of two parts B, B', I secure the rotating cylinder C, between the same by means of connecting bolts H.

The rotating cylinder C, is provided on its periphery with teeth c, which mash with the driving pulley J, from which the cylinder receives its motion. Power is applied to the shaft I, by means of the pulley K or crank K'.

The object to be turned (A) is passed through the center of cylinder C, and firmly fixed to the frame B B', by means of the side frames G, G', and screws g g' as shown in Fig. 2.

The sliding rest D, is constructed in the usual manner and receives lateral movement by means of a suitable screw not here shown. Motion being communicated to the cylinder C, the cutting tool revolves with it around the fixed object, operating upon it as seen in Figs. 1 and 2.

In the manner described I am enabled to construct a lathe by means of which the bearing or journal parts of bulky and unwieldy pieces of mechanism of all kinds, steamship cranks, for example may be turned with the utmost facility and accuracy, thus avoiding the necessity of using the common lathe, the dimensions of which must be sufficient to swing and rotate the article itself.

Perhaps I cannot better illustrate the value of my improvement than by stating that the cost of a common lathe, large enough to turn the central bearing of a crank for a first class steamship, is not less than six thousand dollars; whereas a lathe suitable to do the same work, constructed according to my improvement, can be made for two hundred dollars.

My improvement is also applicable to every description of turning. It occupies much less space than the common lathes, and under many circumstances will be found much more convenient.

The cost of turning cranks, after the lathe is provided, is also much less when my improvement is employed. By the ordinary method it is necessary in swinging the crank to be turned, to provide a secondary crank, and to counter balance the weight of the arms of the original crank, by burdens placed on the opposite side. The actual cost of these appurtenances, in turning the central bearing of a first class steamer crank, is five hundred dollars; for cranks of different dimensions this expense must be involved for each.

By the use of my lathe all such expenses are unnecessary, no extras being required.

I make no claim to the idea of turning a fixed object by having cutters arranged on the inside of a cylinder, for that has been done before; but What I do claim as my invention, and desire to secure by Letters Patent, is—

Arranging one or more slide rests, to which the cutting tools are attached, within a rotating cylinder, in the manner and for the purposes described, or in any other manner substantially equivalent.

GEORGE TUGNOT.

Witnesses:
A. E. BEACH,
S. H. WALES.